United States Patent [19]

Baker et al.

[11] 4,009,321
[45] Feb. 22, 1977

[54] HIGH TEMPERATURE FUEL CELL ELECTROLYTE

[75] Inventors: Bernard S. Baker, Chicago; Leonard G. Marianowski, South Holland, both of Ill.

[73] Assignee: American Gas Association, Inc., Arlington, Va.

[22] Filed: Dec. 20, 1972

[21] Appl. No.: 316,983

Related U.S. Application Data

[63] Continuation of Ser. No. 811,675, March 28, 1969, abandoned, which is a continuation of Ser. No. 506,844, Nov. 8, 1965, abandoned.

[52] U.S. Cl. ................................. 429/46
[51] Int. Cl.$^2$ ........................................ H01M 8/14
[58] Field of Search ............... 136/86, 153; 429/33, 429/46

[56] References Cited

UNITED STATES PATENTS

| | | | |
|---|---|---|---|
| 2,276,188 | 3/1942 | Greger | 136/86 |
| 3,257,239 | 6/1966 | Shultz et al. | 136/86 |

OTHER PUBLICATIONS

Broers et al., Fuel Cells by Young, Published by Reinhold Publishing Corp., 1963, pp. 6–11.

*Primary Examiner*—Donald L. Walton
*Attorney, Agent, or Firm*—Thomas W. Speckman

[57] ABSTRACT

The specification discloses an improved paste electrolyte composition for use in a high-temperature molten carbonate fuel cell, using substantially pure alkali metal aluminate formed from reactive alumina as the only inert material in the electrolyte. Finely divided reactive alumina substantially completely free of silica is admixed with alkali metal carbonates and fired to remove carbon dioxide to form as final inert carrier material substantially pure inert alkali metal aluminate. The initial composition of the starting mixture is selected so that the final composition is between 40 and 70% by weight alkali metal carbonates. In contrast to magnesia supported fuel cells which show a 40% drop-off in power output, the aluminate paste electrolyte-utilizing fuel cells of the invention show essentially no deterioration.

1 Claim, No Drawings

HIGH TEMPERATURE FUEL CELL ELECTROLYTE

CROSS-REFERENCE TO OTHER APPLICATIONS

This case is a continuation of copending application Ser. No. 811,675, filed Mar. 28, 1969 now abandoned, which was a continuation of application Ser. No. 506,844 filed Nov. 8, 1965 now abandoned.

This invention relates to fuel cells, electrolytes and in particular to a novel electrolyte composition for use in a high-temperature molten carbonate fuel cell combination.

High temperature molten carbonate fuel cells of the type herein described are well known in the art and are useful for conversion of chemical energy of hydrocarbons directly to electrical energy by a galvanic oxidation process. Fused carbonates are fundamentally the best adapted salts for high-temperature cells since decomposition by action of carbon dioxide is impossible and concentration polarization can be eliminated by supply carbon dioxide (withdrawn from the combustion products) to the cathodic air (oxygen).

Quantitative measurements have shown that during the galvanic combustion of hydrogen or carbon monoxide with air plus carbon dioxide, one mole of carbon dioxide is taken up at the cathode and liberated at the anode for every mole of hydrogen or carbon monoxide oxidized at the anode:

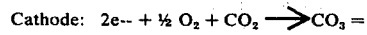

Cathode: $2e^- + \frac{1}{2} O_2 + CO_2 \rightarrow CO_3^=$

Anode: $CO_3^= + H_2 \rightarrow H_2O + CO_2 + 2e^-$

The transfer of the O=ions thus proceeds in the form of $CO_3^=$ ions obtained from gaseous $O_2$ and carbon dioxide at the cathode-electrolyte interface.

Fuel cells, and in particular molten carbonate fuel cells, consist of five principal parts: a fuel chamber to which is fed the fuel mixture; a fuel electrode, where the fuel is anodically oxidized by reaction with carbonate ions; an electrolyte which conducts carbonate ions from cathode to anode; an air electrode where oxygen is galvanically reduced and reacted with carbon dioxide to produce carbonate ion; and an air chamber, to which a mixture of air and carbon dioxide is fed. A typical molten carbonate fuel cell is described in "Fuel Cells", edited by George J. Young, Reinhold Publishing Corporation, 1960, pages 78 through 93.

The present invention is directed to the electrolyte section of the fuel cell and more specifically to the structure and composition of electrolyte. In the past, several approaches to electrolyte structure and composition have been used. One possible configuration employs a free alkali metal carbonate electrolyte contained and held between double porosity electrodes. British Pat. No. 806,592 for example, teaches as one electrolyte a cast material consisting of fused lithium, sodium and potassium carbonates. In addition, Bacon U.S. Pat. No. 2,969,315 teaches a cell in which liquid electrolyte is maintained between the two electrodes.

Another electrolyte system employs a sintered magnesia structure which is impregnated with a molten alkali carbonate. Such systems are taught by Broers U.S. Pat. No. 2,980,749 and Postal U.S. Pat. No. 3,147,149.

A third possible structure and composition as described in Broers U.S. Pat. No. 3,120,456 employs a heterogeneous mixture of molten carbonate electrolyte and inert magnesia powder to form a non-Newtonion paste-like structure at operating temperatures.

Each of the above described electrolyte structures and compositions have serious disadvantages. In the first system, because of the corrosive nature of liquid and molten alkali carbonates, it is difficult to maintain a well-designed interface within a double porosity electrode. In the second system, the sintered magnesia matrix does not effectively retain the molten carbonate. The third system, although an improvement on the first two, still has two important drawbacks. The first drawback is the long-term instability of magnesia in the presence of molten carbonates and the reaction product water. The second problem arises from the fact that magnesia, although effective in retaining the bulk of the alkali metal carbonate, nevertheless allows a thick carbonate film to form on the anode and cathode causing these electrodes to be diffusion limited, i.e., the rate of the electro-chemical reactions which occur are limited by the diffusion of reactants and products through the molten carbonate film on the electrodes.

Yet another known electrode configuration and structure, related to the second system described above, is taught in U.S. Pat. No. 2,276,188 to Greger. Therein, a diaphragm of porous refractory insulator is suggested composed of alumina, magnesia, silica and various amounts of alkali metal compounds and alkaline earth metal compounds. In addition, minor amounts of fluorine and/or titanium may be present. Molten carbonates are then impregnated in the diaphragm and are said to react with the alumina and silica to form aluminates and silocates as well as alumino-silicates. Greger's electrolytes suffer from all the disadvantages of the prior art systems hereinbefore noted since apparently the presence of silica in the diaphragm adversely effects the nature of the carbonate film which forms on the electrodes preventing high and long-lived cell performance characteristics.

By this invention, improved electrolyte system is disclosed which we have found eliminates the problems of the prior art and results in a fuel cell which has substantially better operating characteristics. In our invention, we use substantially pure alkali metal aluminate, formed from alumina, as the only inert material in the electrolyte. Alumina in the presence of molten alkali carbonate reacts to form alkali metal aluminates according to the following reactions.

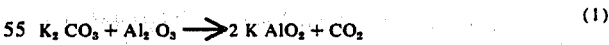

$K_2CO_3 + Al_2O_3 \rightarrow 2\ KAlO_2 + CO_2$ \hfill (1)

$Na_2CO_3 + Al_2O_3 \rightarrow 2\ NaAlO_2 + CO_2$ \hfill (2)

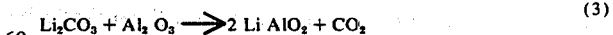

$Li_2CO_3 + Al_2O_3 \rightarrow 2\ LiAlO_2 + CO_2$ \hfill (3)

In our invention the initial starting material for the preparation of the electrolyte is finely divided alumina which is admixed with alkali metal carbonate and fired to remove carbon dioxide to form as final inert carrier material alkali metal aluminate. The firing is repeated until all carbon dioxide is removed according to reactions (1) to (3) above. The initial composition of the starting mixture is adjusted so that the final composition is between 40 and 70% by weight alkali metal carbonates.

To achieve this stable material consisting of aluminate and alkali metal carbonate, our practice has been to use as starting material finely divided alumina with a high surface area, a particularly suitable alumina being one with a surface area in excess of 400 square meters per gram. This material insures a fast and complete reaction between the alumina and the alkali metal carbonate. The alumina is thoroughly mixed with powdered alkali metal carbonate and fired in a furnace at a temperature above the melting point of the mixture. As the carbonate melts, the reaction occurs as illustrated by the aforementioned equations accompanied by evolution of carbon dioxide. The mixture is allowed to react until there is no further evidence of carbon dioxide evolution. It is then cooled and ground up for the process of homogenation, weighed and refired. This procedure is repeated several times until there is no further evidence of weight loss. At this point all of the alumina has been converted to aluminate.

The mixture of fired powder so prepared is then fabricated into electrolyte discs or other suitable shape form for use in a fuel cell by any one of several known techniques, for example, by pressing the powder into a mold at either ambient or elevated (above 400° C) temperatures. In Table I, typical performance characteristics achieved with electrolytes prepared from this material are compared with electrolytes of similar type prepared with magnesia. It can be seen that over an order of magnitude of improvement is achieved.

TABLE I

Fuel 80% $H_2$-20% $CO_2$; Oxidant 14% $O_2$-28% $CO_2$-58% $N_2$

| Voltage | Magnesia Inert Current mA/cm² | Aluminate Inert Current mA/cm² | |
|---|---|---|---|
| | | Typical | Best |
| 1.05 | 2 | 10– | 70 |
| 1.00 | 10 | 25– | 105 |
| 0.90 | 20 | 70– | 180 |
| 0.80 | 30 | 100– | 260 |
| 0.70 | 40 | 140– | 350 |
| 0.60 | 50 | 180– | 420 |

After 2500 hours of operation, magnesia cells showed a 40% drop-off in power output whereas those prepared from aluminate showed essentially no deterioration.

The texture of our aluminate paste electrolyte is considerably different from those prepared with magnesia. The main difference is apparent in the dryness of the electrolyte. Although we do not wish to be bound by any particular theory of operation, it is believed that this apparent dryness which results in improved performance is based on the relative thickness of carbonate films which exist on the electrodes placed in contact with these electrolyte structures.

The following non-limiting examples will illustrate the composition of the invention and method of its formulation.

EXAMPLE I 160 grams of alumina powder having about 400 square meters per gram of surface area were thoroughly admixed with 507 grams of ternary carbonate containing sodium, potassium and lithium carbonates. This mixture was first fired in a furnace under air atmosphere to about 930° F and maintained for 300 minutes. The fired mixture was then cooled, ground up to a fine powder, weighed and refired again at 1290° F for 300 minutes. This procedure was repeated two more times until there was no further loss of carbon dioxide and the mass stabilized at 560 grams. The composition at this time was 62.7 per cent total carbonate and 37.3 per cent aluminate. The powder was then pressed into discs for use as a fuel cell electrolyte.

EXAMPLE II 160 grams of alumina powder having about 400 square meters per gram of surface area were thoroughly admixed with 410 grams of ternary carbonate of the composition of Example I. This mixture was first fired in a furnace under air atmosphere to about 930° F and maintained for 300 minutes. The fired mixture was then cooled, ground up to a fine powder, weighed and refired again at 1290° F. for 300 minutes. This procedure was repeated two more times until there was no further loss of carbon dioxide and the mass stabilized at 451 grams. The composition at this time was 58.2 per cent total carbonate and 41.8 per cent aluminate. The powder was then pressed into discs for use as a fuel cell electrolyte.

Having described our invention, we claim:

1. In an improved high temperature molten carbonate type fuel cell comprising in combination:
   a. a fuel chamber to which is fed a fuel mixture,
   b. an anode at which said fuel is anodically oxidized by reaction with carbonate ions,
   c. a cathode at which oxygen is galvanically reduced and reacted with carbon dioxide to produce carbonate ions,
   d. an oxidant chamber to which is fed a mixture of oxygen containing gas and carbon dioxide, and
   e. an electrolyte system disposed between said cathode and said anode and containing an electrolyte composition for transfer of carbonate ions from said cathode to said anode,
   the improvement of said electrolyte system consisting essentially of:
   i. 40 to 70 weight per cent of a ternary alkali metal carbonate mixture wherein said alkali metal is sodium, potassium, and lithium, and
   ii. 30 to 60 weight per cent of an inert carrier material consisting of alkali metal aluminates mixture as the only inert material in said electrolyte system, wherein said alkali metal is sodium, potassium and lithium, said inert carrier material being the product of reaction of finely divided, substantially silica-free, reactive alumina having a surface area of greater than about 400 square meters per gram with an excess of said ternary alkali metal carbonates mixture at a temperature above the melting point and below the decomposition temperature of said ternary carbonates mixture, until all of said reactive alumina is converted to said aluminates mixture.

* * * * *